United States Patent
Wakayama et al.

(10) Patent No.: US 10,968,141 B2
(45) Date of Patent: Apr. 6, 2021

(54) CONCRETE MANUFACTURING METHOD USING NITROGEN DISSOLVED WATER AND METHOD FOR MANUFACTURING REINFORCED CONCRETE STRUCTURE

(71) Applicant: Showa Freezing Plant Co., Ltd., Kushiro (JP)

(72) Inventors: Toshitsugi Wakayama, Kushiro (JP); Seiko Wakayama, Kushiro (JP)

(73) Assignee: Showa Freezing Plant Co., Ltd., Kushiro (JP)

( * ) Notice: Subject to any disclaimer, the term of this patent is extended or adjusted under 35 U.S.C. 154(b) by 0 days.

(21) Appl. No.: 16/604,498

(22) PCT Filed: May 11, 2017

(86) PCT No.: PCT/JP2017/017780
§ 371 (c)(1),
(2) Date: Oct. 10, 2019

(87) PCT Pub. No.: WO2018/189915
PCT Pub. Date: Oct. 18, 2018

(65) Prior Publication Data
US 2020/0055786 A1 Feb. 20, 2020

(30) Foreign Application Priority Data
Apr. 11, 2017 (JP) .............................. JP2017-078447

(51) Int. Cl.
C04B 40/00 (2006.01)
B28C 7/00 (2006.01)
C04B 28/02 (2006.01)
C04B 111/22 (2006.01)
C04B 111/26 (2006.01)

(52) U.S. Cl.
CPC ............ C04B 40/0046 (2013.01); B28C 7/00 (2013.01); C04B 28/02 (2013.01); C04B 2111/22 (2013.01); C04B 2111/26 (2013.01)

(58) Field of Classification Search
CPC ....... B28C 7/00; B28C 7/0007; B28C 7/0038; B28C 5/4203; B28C 5/468; B28C 9/002; C04B 14/068; C04B 20/023; C04B 22/004; C04B 28/02; C04B 40/0046; C04B 40/0625; C04B 2111/22; C04B 2111/26
See application file for complete search history.

(56) References Cited

U.S. PATENT DOCUMENTS

| | | | | |
|---|---|---|---|---|
| 4,333,764 A | * | 6/1982 | Richardson | ........... C04B 22/062 106/672 |
| 4,448,751 A | * | 5/1984 | Richardson | ........... C04B 22/062 422/68.1 |
| 4,452,898 A | * | 6/1984 | Richardson | ........... C04B 22/062 436/148 |

FOREIGN PATENT DOCUMENTS

| | | | | | |
|---|---|---|---|---|---|
| GB | 2517175 A | * | 2/2015 | ............... | B03B 5/04 |
| JP | S6427653 A | | 1/1989 | | |
| JP | S6485710 A | | 3/1989 | | |
| JP | 01317707 A | * | 12/1989 | ............. | B28C 5/468 |
| JP | 03133606 A | * | 6/1991 | | |
| JP | 04083775 A | * | 3/1992 | | |
| JP | H0938417 A | | 2/1997 | | |
| JP | 2003277163 A | | 10/2003 | | |
| JP | 2007155172 A | | 6/2007 | | |
| JP | 2008230961 A | | 10/2008 | | |
| JP | 2009190184 A | * | 8/2009 | | |
| JP | 2011209222 A | * | 10/2011 | | |
| JP | 2014213479 A | | 11/2014 | | |
| JP | 6024060 B1 | | 11/2016 | | |

OTHER PUBLICATIONS

Kosmatka et al "Design and Control of Concrete Mixtures", Chapter 6 Admixtures for Concrete, Thirteenth Edition, Portland Cement Association, p. 63. (Year: 1988).*

* cited by examiner

*Primary Examiner* — Anthony J Green
(74) *Attorney, Agent, or Firm* — Berenato & White, LLC

(57) ABSTRACT

Provided are a concrete manufacturing method capable of preventing neutralization of concrete and oxidation of a reinforcing rod in reinforced concrete, and a method for manufacturing a reinforced concrete structure using the same. The concrete manufacturing method uses nitrogen dissolved water and is characterized by including: a step of generating nitrogen dissolved water by injecting nitrogen gas into water to replace oxygen and carbon dioxide dissolved in the water with nitrogen; and a step of generating a ready-mixed concrete by kneading the nitrogen dissolved water, cement, an aggregate, and an admixture. The method for manufacturing a reinforced concrete structure is characterized by forming a reinforced concrete structure using a ready-mixed concrete manufactured by a concrete manufacturing method using nitrogen dissolved water.

9 Claims, 2 Drawing Sheets

CONCRETE MANUFACTURING METHOD USING NITROGEN DISSOLVED WATER AND METHOD FOR MANUFACTURING REINFORCED CONCRETE STRUCTURE

CROSS-REFERENCE TO RELATED APPLICATIONS AND CLAIM TO PRIORITY

This application is a national phase of international application number PCT/JP2017/017780, filed May 11, 2017, which claims priority to Japanese application number 2017-078447, filed Apr. 11, 2017, the disclosures of which are incorporated herein by reference and to which priority is claimed.

FIELD OF THE INVENTION

The present invention relates to a concrete manufacturing method and a method of manufacturing a reinforced concrete structure.

BACKGROUND OF THE INVENTION

In current reinforced concrete structures, deterioration of concrete and reinforcing rod corrosion caused by carbon dioxide, oxygen, moisture, chloride ions, and the like, have become problems. Penetration of carbon dioxide causes a reaction with calcium hydroxide in the concrete to generate calcium carbonate that neutralizes the concrete, and causes rusting in the reinforcing rod. Penetration of oxygen results in reinforcing rod corrosion caused by oxidation, causing rusting thereof.

Patent Literature 1 discloses lightweight aerated concrete having excellent carbonation resistance property. Patent Literature 2 discloses acid-resistant concrete and iron corrosion inhibiting concrete.

Patent Literatures 3 and 4 disclose a method of manufacturing water for manufacturing concrete that aims to improve the property of concrete.

Meanwhile, in a completely different field, there are known nitrogen dissolved water and a manufacturing method thereof, in which the dissolved amount of oxygen is lowered and the dissolved amount of nitrogen is increased. Patent Literature 5 discloses a technique in which the water surface in a fish hold is covered with nitrogen dissolved ice obtained by freezing nitrogen dissolved water, and the dissolved amount of oxygen in water in the fish hold is reduced by melting of nitrogen-gas-filled ice, so that fish is kept fresh.

Patent Literature 6 discloses a manufacturing system and a manufacturing method of nitrogen dissolved water that contains more nitrogen stably than nitrogen saturated dissolved water in which dissolved oxygen in water is substituted for nitrogen and nitrogen is dissolved to the saturated dissolved amount.

CITATION LIST

Patent Literatures

Patent Literature 1: Japanese Patent Application Laid-open No. 2003-277163
Patent Literature 2: Japanese Patent Application Laid-open No. 2008-230961
Patent Literature 3: Japanese Patent Application Laid-open No. H9-38417
Patent Literature 4: Japanese Patent Application Laid-open No. 2014-213479
Patent Literature 5: Japanese Patent Application Laid-open No. 2007-155172
Patent Literature 6: Japanese Patent Publication No. 6024060

SUMMARY OF THE INVENTION

The concrete that is excellent in the carbonation resistance property and the oxidation resistance property in Patent Literatures 1 and 2 has a feature in a concrete component other than water, such as cement. The water for manufacturing concrete in Patent Literatures 3 and 4 reuses waste water that has been used once for manufacturing concrete, and a special treatment is not usually performed for the water for manufacturing concrete.

The present invention has been made in view of the above problems and it is an object of the present invention to provide a concrete manufacturing method that can prevent or reduce neutralization of concrete and oxidation of reinforcing rod in reinforced concrete, and a method of manufacturing a reinforced concrete structure using the same.

In order to solve the above problems, the present invention provides the following configurations.

An aspect of the present invention is to provide a concrete manufacturing method, comprising: a step of substituting oxygen and carbon dioxide that are dissolved in water for nitrogen by injecting nitrogen gas into the water, to generate nitrogen dissolved water; and a step of kneading the nitrogen dissolved water, cement, an aggregate, and an admixture to generate ready-mixed concrete. It is preferable to use an aggregate washed with nitrogen dissolved water.

Another aspect of the present invention provides a method of manufacturing a reinforced concrete structure, comprising forming a reinforced concrete structure by using ready-mixed concrete manufactured by the concrete manufacturing method using nitrogen dissolved water.

The concrete manufacturing method of the present invention injects nitrogen gas into water as a material to generate nitrogen dissolved water in which oxygen and carbon dioxide that are dissolved are substituted for nitrogen, and uses this nitrogen dissolved water as water for manufacturing concrete. Since ready-mixed concrete manufactured by using the nitrogen dissolved water contains less carbon dioxide as compared with ready-mixed concrete manufactured by using usual water, neutralization resistance property is improved. Further, since a reinforced concrete structure formed by using the ready-mixed concrete manufactured in accordance with the present invention contains less oxygen in concrete as compared with a usual reinforced concrete structure, oxidation resistance property is improved. As a result, it is possible to prevent or reduce deterioration of a reinforced concrete structure caused by neutralization and oxidation.

DETAILED DESCRIPTION OF THE PREFERRED EMBODIMENTS

Embodiments of the present invention will be described below with reference to the drawings showing an example.

In this specification, "nitrogen substitution" in water means that the dissolved amount of oxygen and the dissolved amount of carbon dioxide in water, determined by the temperature under an atmospheric pressure, are significantly reduced or are reduced to approximately zero and nitrogen is dissolved in place of oxygen and carbon dioxide. Further, the water obtained in this manner is called "nitrogen dissolved water". Furthermore, it is assumed that the nitrogen dissolved water includes water in which oxygen and carbon dioxide are substituted for nitrogen and which contains more dissolved nitrogen. In addition, in this specification, a phrase that a gas is "dissolved" in a liquid refers to a case where a gas is dissolved in a liquid at a molecular level as well as a case where a gas is stably present in a liquid as fine bubbles.

Figure 1:
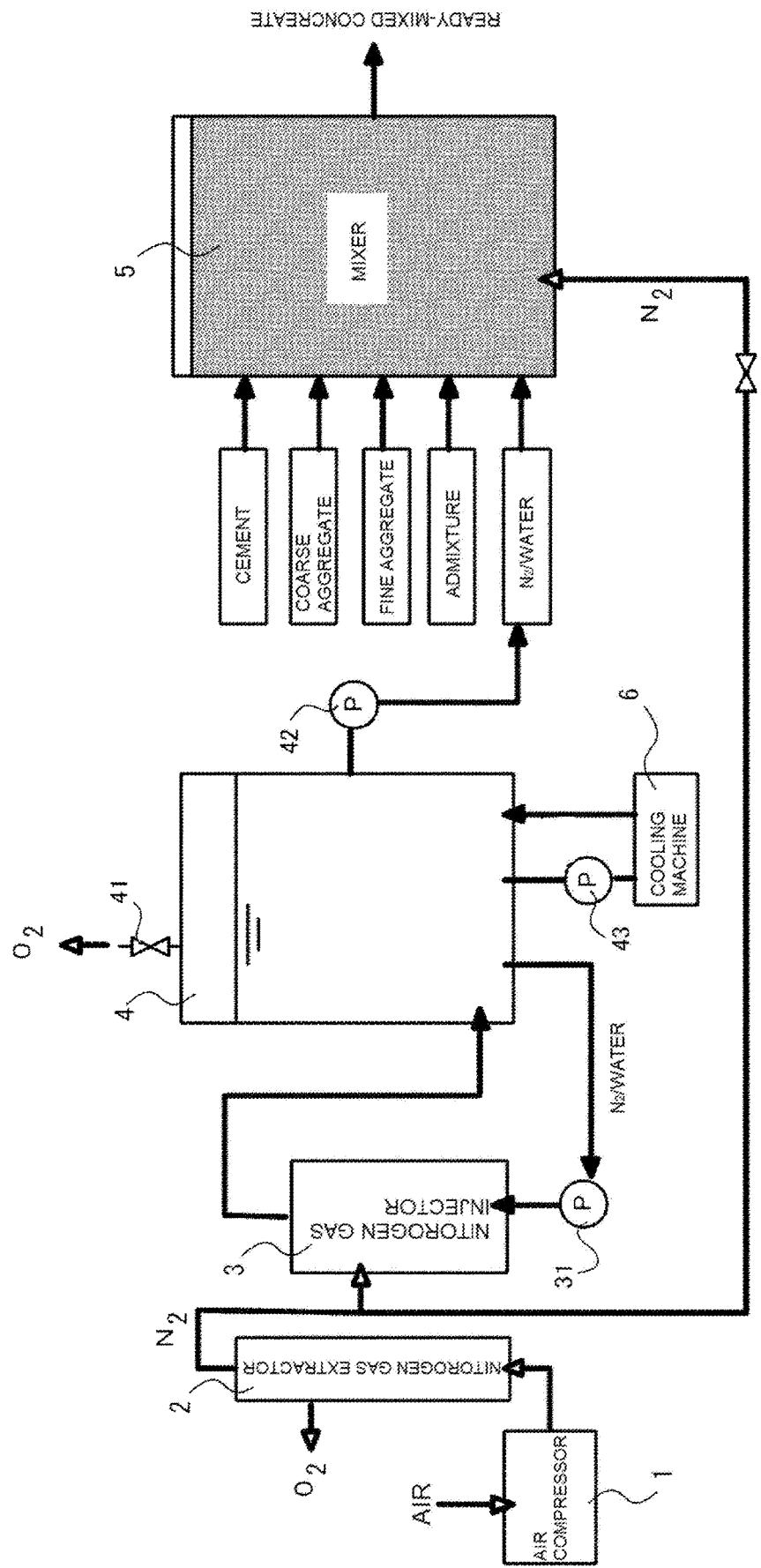
FIG. 1 is a schematic configuration diagram showing an example of a system configuration used for a concrete manufacturing method using nitrogen dissolved water.

FIG. 1 is a schematic configuration diagram showing an example of a concrete manufacturing system to which a concrete manufacturing method using nitrogen dissolved water is applied. In FIG. 1, an arrow with a white arrow head represents a gas flow, and an arrow with a black arrow head represents a flow or transfer of a solid (powder) or a liquid.

The concrete manufacturing system is constituted by a nitrogen-dissolved-water generation system and a mixer 5 that kneads components of concrete. In the present example, the nitrogen-dissolved-water generation system and the mixer 5 are installed at the same place. In another example, the nitrogen-dissolved-water generation system may be installed at a different place from the mixer 5. In this case, nitrogen dissolved water manufactured by the nitrogen-dissolved-water generation system is carried to the place where the mixer 5 is installed and is used as water for manufacturing concrete.

The nitrogen-dissolved-water generation system includes a water tank 4 and also includes a nitrogen-gas injection apparatus that causes water filled in the water tank 4 to circulate and injects nitrogen gas into the circulating water. The nitrogen-gas injection apparatus is constituted by an air compressor 1, a nitrogen gas extractor 2, and a nitrogen gas injector 3 in this configuration example. The air compressor 1 compresses the atmosphere and sends it to the nitrogen gas extractor 2. For example, an air compressor having a supply air pressure of 0.5 to 0.9 MPa is used.

The nitrogen gas extractor 2 takes in the compressed air at one end of a pressure vessel provided with a nitrogen separation membrane formed by a polyimide hollow fiber membrane, purges oxygen through a port at the side, and extracts nitrogen gas from the other end of the pressure vessel. The nitrogen gas extractor 2 uses the fact that the rate of transmission through a membrane varies depending on the type of gas.

The nitrogen gas injector 3 has a capability of allowing water of 2 t (2 m$^3$) per hour to pass therethrough, for example, to perform injection of nitrogen gas into the water and expelling oxygen until the dissolved amount of oxygen becomes approximately zero. The nitrogen gas injector 3 has an injection nozzle (not shown) that emits nitrogen gas, and the nitrogen gas at a high pressure of up to 0.8 MPa, for example, is injected into the water. It is preferable that the injection nozzle of the nitrogen gas injector 3 has a structure that makes bubbles of nitrogen gas to be injected as fine as possible in order to achieve efficient nitrogen substitution. For example, there is an apparatus in which the nitrogen gas extractor 2 and the nitrogen gas injector 3 are integrated with each other, for example, a degassing apparatus "Ripureru" (registered trademark: manufactured by KATAYAMA CHEMICAL, INC.).

A circulation path constituted by a water supply pipe for causing water to circulate in a reciprocating manner is formed between the water tank 4 and the nitrogen gas injector 3. A circulation pump 31 is provided in the circulation path. Nitrogen gas is injected into circulating water, so that dissolved oxygen in the water is expelled and substituted for nitrogen.

The water tank 4 is provided with an opening/closing valve 41 at its ceiling. The opening/closing valve 41 allows an interior space of the water tank 4 (a space between the water surface and the ceiling) to communicate with outside or blocks communication between the interior space and the outside. Except for the opening/closing valve 41, the nitrogen gas injector 3, water tank 4, and the circulation path are preferably configured to be sealed against water and gas. It is preferable that the water tank 4 is provided with a thermometer for measuring the water temperature, a dissolved oxygen analyzer for measuring the dissolved amount of oxygen in water, and the like, although not shown. The volume of the water tank 4 is chosen as appropriate in accordance with the amount of concrete to be manufactured.

Although not shown, it is preferable that a control unit is provided and the control unit controls the air compressor 1 and the circulation pump 31 in the nitrogen-gas injection apparatus to operate and stop. The control unit also controls opening and closing of the opening/closing valve 41. Further, the control unit controls operating and stopping of the nitrogen-gas injection apparatus and opening and closing of the opening/closing valve 41 based on measured values of the thermometer and the dissolved oxygen analyzer. This control can be performed by an electric signal by using a microcomputer or the like.

After water as a material is filled into the water tank 4 and a nitrogen substitution process is started, the control unit monitors the measured value of the dissolved oxygen analyzer, thereby detecting completion of nitrogen substitution. During nitrogen substitution, the control unit controls the opening/closing valve 41 to be opened. Therefore, oxygen and carbon dioxide expelled from the water pass through the opening/closing valve 41 and are released to the outside. Because the opening/closing valve 41 is opened, the interior space of the water tank 4 during nitrogen substitution is at an atmospheric pressure. The opening/closing valve 41 also has a function of a check valve capable of only allowing release to the outside in an open state. Nitrogen dissolved water is obtained at completion of nitrogen substitution in which oxygen and carbon dioxide dissolved in the water are substituted for nitrogen. The nitrogen dissolved water obtained in this manner is used for water for manufacturing concrete.

In order to manufacture ready-mixed concrete, the nitrogen dissolved water is transferred from the water tank 4 to the mixer 5 by a transfer pump 42. In addition to the nitrogen dissolved water, components of concrete including at least cement, an aggregate including a coarse aggregate and a fine aggregate, and an admixture are put into the mixer 5 and are kneaded in an identical manner to that in a usual manufacturing method. The kind and the composition of the components other than the nitrogen dissolved water may be identical to those in a usual concrete manufacturing method. That is, the kind and the composition of the components are determined in accordance with required concrete characteristics. Ready-mixed concrete manufactured in accordance with the present invention is a mixture including at least the nitrogen dissolved water, the cement, the aggregate, and the admixture as the components.

The aggregate is formed by crushed stone, gravel, and the like. Land crushed stone and gravel, which do not contain salt, are used at present. Crushed stone and gravel collected from the sea can be used as the aggregate, if they are washed with water to remove salt. In this case, it is preferable to use nitrogen dissolved water as the water for washing the aggregate.

When ready-mixed concrete is kneaded, the mixture generates heat due to reaction. Therefore, use of cool water and injection of ice are generally performed. Therefore, in another example of the present invention, the nitrogen dissolved water obtained in the water tank 4 may be made into ice by an ice machine and put into the mixer 5 in the form of ice. In a case of mixing the nitrogen dissolved water to be mixed into concrete as ice in whole or in part, the amount of the ice is determined considering the total amount of required water.

Preferably, nitrogen gas extracted by the nitrogen gas extractor 2 is sent to the mixture in the mixer 5 at the time of kneading in the mixer 5, as shown in FIG. 1. Accordingly, carbon dioxide and oxygen are prevented from being taken into the nitrogen dissolved water again, and dissolved nitrogen is maintained. In another example, no nitrogen may be supplied from the air compressor 1 and the nitrogen gas extractor 2 in FIG. 1, and nitrogen gas may be supplied to the mixture in the mixer 5 by using a common nitrogen gas cylinder.

In this manner, concrete, that is, so-called ready-mixed concrete is obtained by the manufacturing method according to the present invention. Ready-mixed concrete is immediately used if being manufactured at a used place. In some cases, ready-mixed concrete is manufactured in a manufacturing plant, delivered to its used place by a concrete mixer truck, and is then used. In the latter case, nitrogen dissolved water is used as water in the ready-mixed concrete manufacturing plant. In this case, a nitrogen-dissolved-water generation system can be incorporated as a part of the ready-mixed concrete manufacturing plant.

In a case of delivering ready-mixed concrete by a concrete mixer truck, it is preferable to provide nitrogen gas supply equipment in the concrete mixer truck in order to supply nitrogen gas to the ready-mixed concrete that is being delivered. The nitrogen gas supply equipment is a combination of the air compressor 1 and the nitrogen gas extractor 2 shown in FIG. 1 or a common nitrogen gas cylinder, for example.

Ready-mixed concrete manufactured by using nitrogen dissolved water contains less carbon dioxide as compared with ready-mixed concrete manufactured by using usual water (tap water). Therefore, the neutralization resistance property of concrete after being hardened is improved. Further, a reinforced concrete structure formed by using the ready-mixed concrete manufactured in accordance with the present invention contains less oxygen in concrete after being hardened as compared with a usual reinforced concrete structure. Therefore, the oxidation resistance property is improved. As a result, deterioration of reinforcing rod and rusting caused by neutralization and oxidation are reduced, and it is possible to prevent or reduce deterioration of the reinforced concrete structure.

In the nitrogen-dissolved-water generation system, it is preferable that the water tank 4 is provided with cooling equipment. In the example of FIG. 1, water is made to circulate between the water tank 4 and a cooling machine 6 installed outside the water tank 4 by a pump 43. Therefore, it is possible to lower the water temperature and perform nitrogen substitution. The dissolved amount of nitrogen is increased as the temperature becomes lower. Therefore, it is preferable to lower the temperature. The water temperature is kept at about 5° C., for example. The control unit may control the cooling equipment based on a measured value of a thermometer.

In a preferable example, after completion of nitrogen substitution, the opening/closing valve 41 is closed to place the water tank 4 in a completely sealed state. Thereafter, the nitrogen-gas injection apparatus further continues to be operated for a predetermined time of about 5 to 10 minutes, for example. Because the water tank 4 is in a completely sealed state, bubbles of nitrogen gas injected into water rise and are released to the interior space of the water tank 4, so that the interior space becomes a nitrogen atmosphere at a higher pressure than an atmospheric pressure.

In the water tank 4 under the high-pressure nitrogen atmosphere, nitrogen gas continuously injected into nitrogen dissolved water is dissolved into water to the saturated dissolved amount of nitrogen at that temperature and that pressure. The saturated dissolved amount of nitrogen at this time is more than that under an air atmosphere at an atmospheric pressure. After a predetermined time, the nitrogen-gas injection apparatus is stopped. At this time, as compared with nitrogen dissolved water at an atmospheric pressure, more carbon dioxide and oxygen are removed and more nitrogen is contained in the nitrogen dissolved water in the water tank 4. Therefore, the nitrogen dissolved water in the water tank 4 is more suitable as water for manufacturing concrete.

Figure 2:
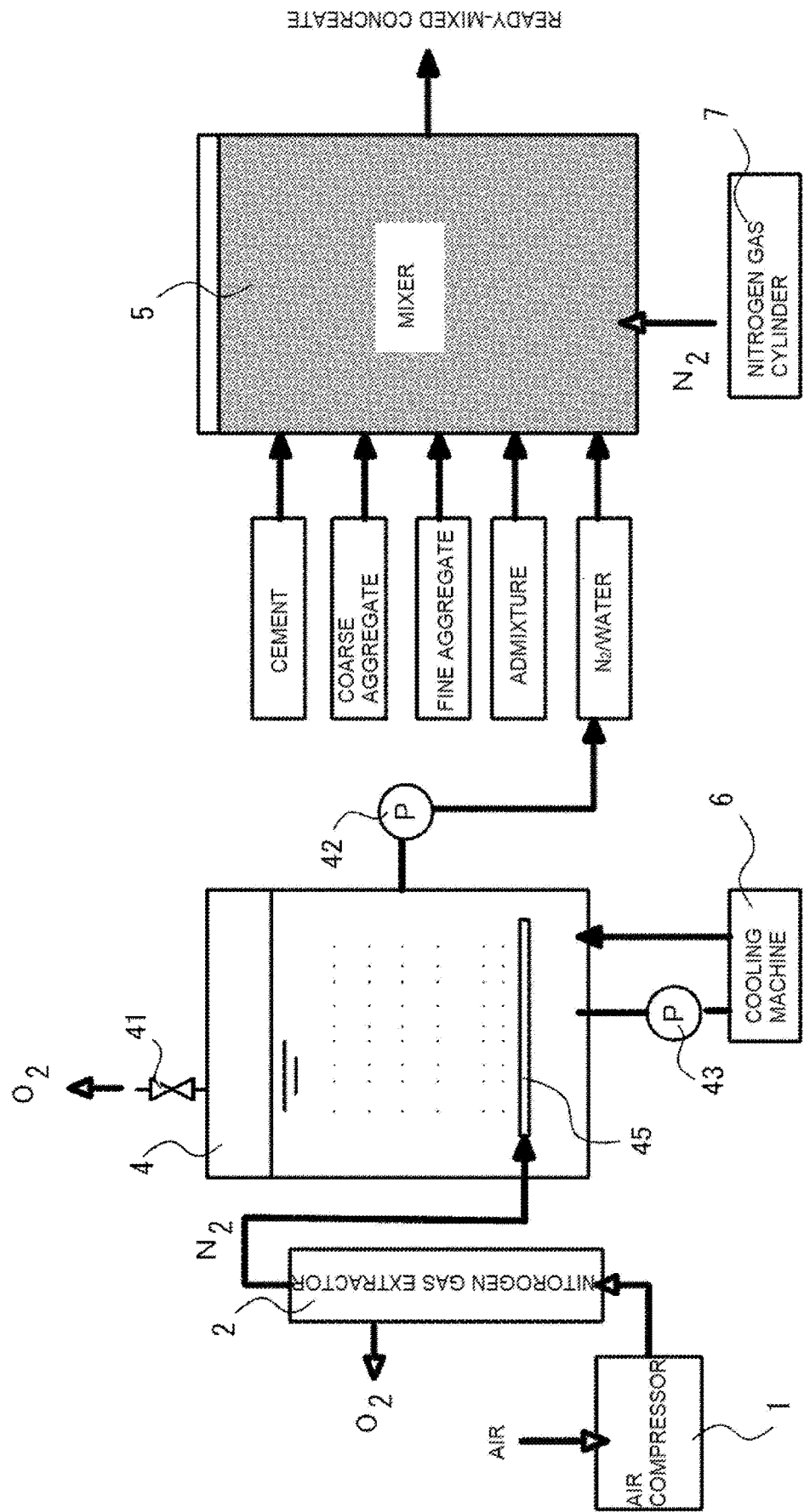
FIG. 2 is a schematic configuration diagram showing another example of the system configuration used for a concrete manufacturing method using nitrogen dissolved water.

FIG. 2 is a schematic configuration diagram showing another example of a manufacturing system to which a concrete manufacturing method using nitrogen dissolved water is applied. Descriptions of configurations identical to those in FIG. 1 are omitted. In the configuration of FIG. 2, nitrogen gas extracted by the nitrogen gas extractor 2 is supplied to a nozzle device 45 provided in water in the water tank 4, thereby achieving nitrogen substitution. The nozzle device 45 is a long tube with a number of holes formed in its wall. Nitrogen gas is injected into water as fine bubbles through the holes. Therefore, nitrogen can be present in nitrogen dissolved water stably for a long time. Stability is improved as the bubbles of nitrogen are finer. Therefore, nano-size bubbles are more preferable than micro-size bubbles. In addition, in the configuration of FIG. 2, nitrogen gas is injected into the mixer 5 by using a common nitrogen gas cylinder 7.

Example

A test was conducted which compares water as a material (tap water) and nitrogen dissolved water obtained by the nitrogen-dissolved-water generation system described above with each other.

<Samples>

Sample of comparative example: tap water

Sample of example: nitrogen dissolved water generated by the nitrogen-dissolved-water generation system in the manufacturing system in FIG. 1

<Test Method>

The sample of the comparative example and the sample of the example were collected and were then sealed in containers under the same condition. For each sample, the temperature, dissolved oxygen, and residual chlorine were measured under the same condition on the day of collection, three days after collection, and five days after correction.

<Test Results>

All test results are represented in Table 1.

TABLE 1

| | Tap Water (Comparative Example) | | | Nitrogen Dissolved Water (Example) | | |
|---|---|---|---|---|---|---|
| | Day of Collection | 3 days after Collection | 5 days after Collection | Day of Collection | 3 days after Collection | 5 days after Collection |
| Temperature (° C.) | 8.5 | 8.5 | 8.5 | 4.5 | 4.5 | 4.5 |
| Dissolved Oxygen (mg/L) | 14.6 | 13.7 | 13.5 | 1.4 | 1.4 | 1.4 |
| Residual Chlorine (mg/L) | 0.4 | 0.3 | 0.2 | Less than 0.1 | Less than 0.1 | Less than 0.1 |
| pH value | 6.8 | 7.0 | 6.6 | 7.2 | 7.2 | 7.0 |

As represented in Table 1, despite the fact that the measurement with regard to the example was conducted at a lower temperature than with regard to the comparative example, dissolved oxygen in the example is about one tenth of that in the comparative example. This shows that dissolved oxygen has been sufficiently removed.

Further, residual chlorine is also less in the example than in the comparative example. Residual chlorine contains hypochlorous acid and hypochlorite ion that are free chlorine, and is strongly acidic. It can be said that nitrogen dissolved water is suitable for manufacturing concrete with improved oxidation resistance property, also for the reason that it contains less residual chlorine.

Also regarding pH values, values in the example become alkaline as compared with those in the comparative example. Therefore, it can be said that nitrogen dissolved water is suitable for manufacturing concrete with improved neutralization resistance property.

REFERENCE SIGNS LIST

1 air compressor
2 nitrogen gas extractor
21 switch valve
3 nitrogen gas injector
31 circulation pump
4 water tank
5 mixer
6 cooling machine
7 nitrogen gas cylinder
41 opening/closing valve
42, 43 transfer pump
45 nozzle device

The invention claimed is:

1. A concrete manufacturing method using nitrogen dissolved water, the method comprising the steps of:
    compressing atmospheric air to provide compressed air;
    purging oxygen from the compressed air to generate a nitrogen gas;
    substituting oxygen and carbon dioxide that are dissolved in water with nitrogen by injecting the nitrogen gas into water to generate the nitrogen dissolved water; and
    kneading the nitrogen dissolved water, cement, an aggregate, and an admixture to generate ready-mixed concrete.

2. The concrete manufacturing method using nitrogen dissolved water according to claim 1, wherein an aggregate washed with the nitrogen dissolved water is used as the aggregate.

3. A method of manufacturing a reinforced concrete structure, comprising forming a reinforced concrete structure by using ready-mixed concrete manufactured by the concrete manufacturing method using nitrogen dissolved water according to claim 1.

4. A method of manufacturing a reinforced concrete structure, comprising forming a reinforced concrete structure by using ready-mixed concrete manufactured by the concrete manufacturing method using nitrogen dissolved water according to claim 2.

5. The concrete manufacturing method using nitrogen dissolved water according to claim 1, wherein the compressing step is accomplished with an air compressor.

6. The concrete manufacturing method using nitrogen dissolved water according to claim 1, wherein the purging step is accomplished with a nitrogen gas extractor.

7. A method of manufacturing a reinforced concrete structure, comprising forming a reinforced concrete structure by using ready-mixed concrete manufactured by the concrete manufacturing method using nitrogen dissolved water according to claim 1.

8. A concrete manufacturing method using nitrogen dissolved water, the method comprising the steps of:
    compressing atmospheric air with an air compressor to provide compressed air;
    purging oxygen from the compressed air with a nitrogen gas extractor to generate a nitrogen gas;
    substituting oxygen and carbon dioxide that are dissolved in water with nitrogen by injecting nitrogen gas into the water to generate nitrogen dissolved water; and
    kneading the nitrogen dissolved water, cement, an aggregate, and an admixture to generate ready-mixed concrete.

9. The concrete manufacturing method using nitrogen dissolved water according to claim 8, including the step of:
    providing an aggregate that has been washed with nitrogen dissolved water.

* * * * *